US012560928B2

(12) United States Patent
Kudo et al.

(10) Patent No.: US 12,560,928 B2
(45) Date of Patent: Feb. 24, 2026

(54) ROUTE CHANGE SYSTEMS AND METHODS FOR STOPPING AUTONOMOUS TRAVEL AT A MODIFIED STOP POSITION

(71) Applicant: Yanmar Holdings Co., Ltd., Osaka (JP)

(72) Inventors: Junko Kudo, Osaka (JP); Takuya Iwase, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 222 days.

(21) Appl. No.: 18/268,965

(22) PCT Filed: Dec. 3, 2021

(86) PCT No.: PCT/JP2021/044461
§ 371 (c)(1),
(2) Date: Jun. 21, 2023

(87) PCT Pub. No.: WO2022/138070
PCT Pub. Date: Jun. 30, 2022

(65) Prior Publication Data
US 2024/0045430 A1 Feb. 8, 2024

(30) Foreign Application Priority Data
Dec. 22, 2020 (JP) ................................. 2020-212146

(51) Int. Cl.
*G05D 1/02* (2020.01)
*G05D 1/00* (2024.01)

(52) U.S. Cl.
CPC ......... *G05D 1/0212* (2013.01); *G05D 1/0088* (2013.01)

(58) Field of Classification Search
CPC .............. G05D 1/617; G05D 2105/15; G05D 2107/20; G05D 2107/21; G05D 2107/23;
(Continued)

(56) References Cited

U.S. PATENT DOCUMENTS 11,520,332 B1 * 12/2022 Zamiska .............. G05D 1/0251
2015/0319913 A1 * 11/2015 Foster ................... A01B 69/00
701/26
(Continued)

FOREIGN PATENT DOCUMENTS

JP H09-154315 A 6/1997
JP 2000-172337 A 6/2000
(Continued)

OTHER PUBLICATIONS

Japanese Office Action issued dated Nov. 29, 2023 issued in JP2020212146.
(Continued)

*Primary Examiner* — Erin M Piateski
*Assistant Examiner* — Ashley Tiffany Schoech
(74) *Attorney, Agent, or Firm* — NORTON ROSE FULBRIGHT US LLP

(57) ABSTRACT

A route setting device is provided with a status confirmation part and a change route setting part. The status confirmation part receives, with respect to a work vehicle that is moving along a preset work route in a field, an instruction by which the work vehicle moves to a stop position not included in the work route, and acquires the position of the work vehicle. The change route setting part creates a change route along which the work vehicle moves to the stop position on the basis of the instruction. The starting point of the change route represents the position of the work vehicle at a time when a waiting time for change equaling or exceeding a delay time set on the basis of the processing time for creating the change route has elapsed after receiving the instruction.

10 Claims, 14 Drawing Sheets

(58) Field of Classification Search
CPC .. G05D 2107/24; G05D 2109/10; G05D 1/43;
G05D 1/644; G05D 1/646; G05D 1/648;
A01B 69/008; B60W 60/001; B60W
60/0021; B60W 2300/15; B60W
2300/152; B60W 2300/154; B60W
2300/156; B60W 2300/158
See application file for complete search history.

(56)                    References Cited

U.S. PATENT DOCUMENTS

| | | | |
|---|---|---|---|
| 2016/0274579 A1* | 9/2016 | So | A47L 11/24 |
| 2017/0229029 A1* | 8/2017 | Klinger | H01Q 3/28 |
| 2022/0042807 A1* | 2/2022 | Benericetti | G01C 21/3461 |

FOREIGN PATENT DOCUMENTS

| | | | |
|---|---|---|---|
| JP | 2015-112071 A | 6/2015 | |
| JP | 2018-050491 A | 4/2018 | |
| JP | 2018099043 A | 6/2018 | |
| JP | 2019-174890 A | 10/2019 | |
| JP | 2020-039273 A | 3/2020 | |
| JP | 2020-135793 A | 8/2020 | |
| WO | WO-2020085229 A1 * | 4/2020 | G01C 21/24 |

OTHER PUBLICATIONS

International Search Report dated Mar. 1, 2022 issued in corresponding PCT Application PCT/JP2021/044461.

* cited by examiner

ROUTE CHANGE SYSTEMS AND METHODS FOR STOPPING AUTONOMOUS TRAVEL AT A MODIFIED STOP POSITION

CROSS-REFERENCE TO RELATED APPLICATIONS

This application is a national stage application pursuant to 35 U.S.C. § 371 of International Application No. PCT/JP2021/044461, filed on Dec. 3, 2021, which claims priority under 35 U.S.C. § 119 to Japanese Patent Application No. 2020-212146 filed on Dec. 22, 2020, the disclosures of which are hereby incorporated by reference in their entireties.

TECHNICAL FIELD

The present invention relates to a route setting method, an autonomous traveling method, a route setting device, an autonomous traveling system, and a storage medium.

BACKGROUND ART

In recent years, autonomous traveling systems automatically moving in fields to perform agricultural work have been studied.

Patent Literature 1 (Japanese Patent Laid Open No. 09-154315) discloses a control device with which positions for replenishing materials and discharging harvests are preliminarily set in a field, and a work vehicle working in the field is moved to the set positions on the basis of instructions from a worker.

Patent Literature 2 (Japanese Patent Laid Open No. 2019-174890) discloses an autonomous traveling system for moving a work vehicle working in a field to a preset retreat region on the basis of an instruction from a worker.

CITATION LIST

Patent Literature

Patent Literature 1: Japanese Patent Laid Open No. 09-154315
Patent Literature 2: Japanese Patent Laid Open No. 2019-174890

DISCLOSURE OF INVENTION

In the techniques described in Patent Literatures 1 and 2 do not consider the orientation of the work vehicles having been moved to the replenishment position or the retreat region. The work efficiency of a worker depends on the orientation of the work vehicles having been moved to the replenishment position or the retreat region. In addition, a route along which each work vehicle is moved to the replenishment position or the retreat region is created on the basis of the current position of the work vehicle. The work vehicle stops when the route thereof is changed from a work route along which the work vehicle works to a route along which the work vehicle moves to the replenishment position or the retreat region. Therefore, the work efficiency of the work vehicle decreases.

In view of the above circumstances, one purpose of the present disclosure is to provide a route setting device for improving work efficiency of a worker in a field. Other purposes can be understood from the following descriptions and the description of embodiments.

A route setting method according to one embodiment for achieving the above purpose includes receiving an instruction to a work vehicle moving along a preset work route in a field to move to a stop position not included in the work route, and acquiring the position of the work vehicle. In addition, the route setting method includes creating a change route along which the work vehicle moves to the stop position on the basis of the instruction. The starting point of the change route indicates the position of the work vehicle at a time at which a change waiting time equal to or longer than a delay time set on the basis of the processing time for creating the change route has elapsed after receiving the instruction.

A route setting method according to one embodiment for achieving the above purpose includes receiving an instruction to a work vehicle moving along a preset work route in a field to move to a stop position not included in the work route, and acquiring the position of the work vehicle. In addition, the route setting method includes creating a change route along which the work vehicle moves to the stop position on the basis of the instruction. The change route is created so that the direction of travel of the work vehicle is in line with a set stop direction at the stop position.

An autonomous traveling method according to one embodiment for achieving the above purpose includes the above-described route setting method and includes automatically moving the work vehicle along the change route or the work route.

A route setting device according to one embodiment for achieving the above purpose includes a status confirmation part and a change route setting part. The status confirmation part receives an instruction to a work vehicle moving along a preset work route in a field to move to a stop position not included in the work route, and acquires the position of the work vehicle. The change route setting part creates a change route along which the work vehicle moves to the stop position on the basis of the instruction. The starting point of the change route indicates the position of the work vehicle at a time at which a change waiting time equal to or longer than a delay time set on the basis of the processing time for creating the change route has elapsed after receiving the instruction.

A route setting device according to one embodiment for achieving the above purpose includes a status confirmation part and a change route setting part. The status confirmation part receives an instruction to a work vehicle moving along a preset work route in a field to move to a stop position not included in the work route, and acquires the position of the work vehicle. The change route setting part creates a change route along which the work vehicle moves to the stop position on the basis of the instruction. The change route is created so that the direction of travel of the work vehicle is in line with a set stop direction at the stop position.

An autonomous traveling system according to one embodiment for achieving the above purpose includes the above-described route setting device and a work vehicle automatically moving along the change route or the work route.

A storage medium according to one embodiment for achieving the above purpose stores a route setting program. The route setting program causes a computing device to execute reception of an instruction to a work vehicle moving along a preset work route in a field to move to a stop position not included in the work route. In addition, the route setting program causes the computing device to execute acquisition of the position of the work vehicle. Furthermore, the route setting program causes the computing device to execute creation of a change route along which the work vehicle moves to the stop position on the basis of the instruction. The change route is created so that the direction of travel of the work vehicle is in line with a set stop direction at the stop position.

According to the above-described aspects, the route setting device improves the work efficiency of a worker in a field.

DESCRIPTION OF EMBODIMENTS

Embodiment 1

Figure 1:
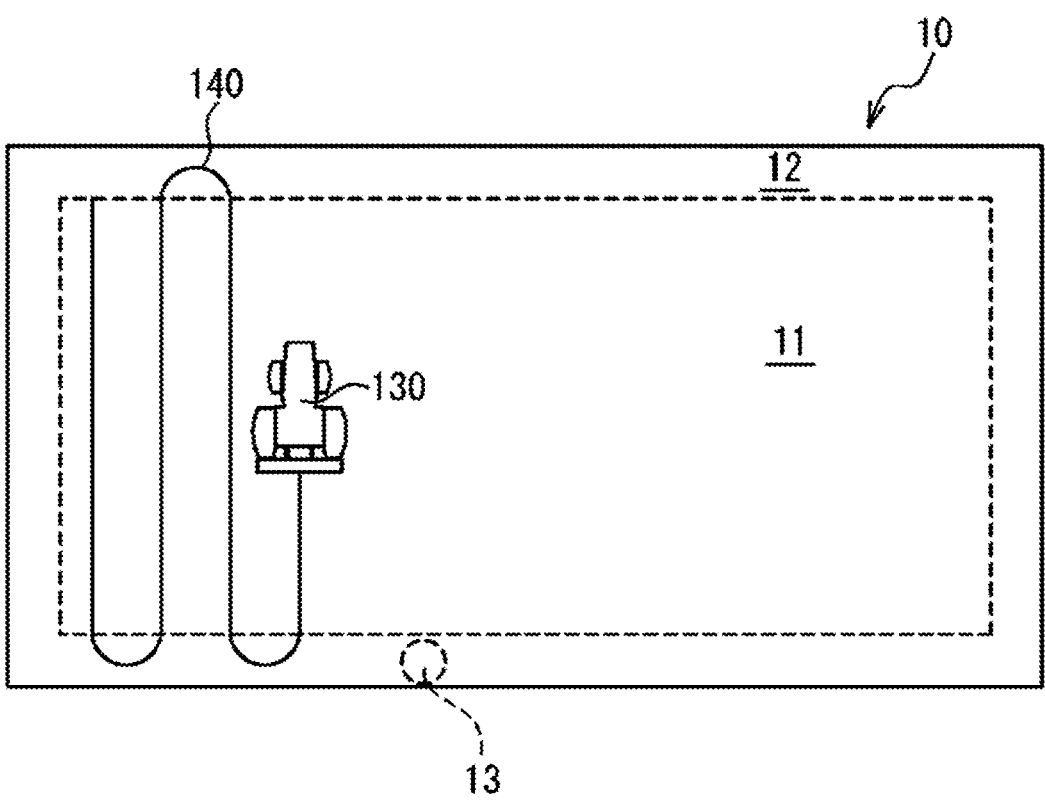
FIG. 1 is a schematic diagram of a filed in one embodiment.

An autonomous traveling system 100 according to the present embodiment of the present invention will be described with reference to drawings. In the present embodiment, a field 10 in which work such as tillage, ground leveling, manuring, and harvesting is carried out using a work vehicle 130 has a central work region 11 and a headland 12 surrounding the work region 11, as illustrated in FIG. 1. The work region 11 indicates a region in which work is carried out to cultivate crops. The headland 12 is provided to allow the work vehicle 130 to turn, for example. The work vehicle 130 automatically moves along a preset work route 140. The work vehicle 130 includes: a vehicle that tows a work machine, such as a tractor; and a vehicle formed integrally with the work machine, such as a combine harvester. The work vehicle 130 carries out work using the work machine in the field 10 by moving along the work route 140 within the field 10.

The work vehicle 130 carries out work within the field 10 while consuming materials mounted on the work machine, such as seedlings, fertilizers, and agrochemicals. When the amount of the materials mounted on the work machine becomes low, the work vehicle 130 moves off the work route 140 to a predetermined stop position 13 in order to replenish materials. The work vehicle 130 stops at the stop position 13 such that the direction of travel is oriented to a predetermined direction, for example, oriented to a direction in which materials can be easily replenished. In addition, the work vehicle 130 may move without stopping when the work vehicle 130 moves off the work route 140. A worker can efficiently work thereby.

In addition, the work vehicle 130 carries out work within the field 10 while storing harvested crops. When the amount of the crops stored in the work machine becomes large, the work vehicle 130 moves off the work route 140 to a predetermined stop position 13 in order to discharge the crops. In this case again, a worker can efficiently work by allowing the work vehicle 130 to stop such that the direction of travel thereof is oriented to a predetermined direction.

Configuration of Autonomous Traveling System

Figure 2:
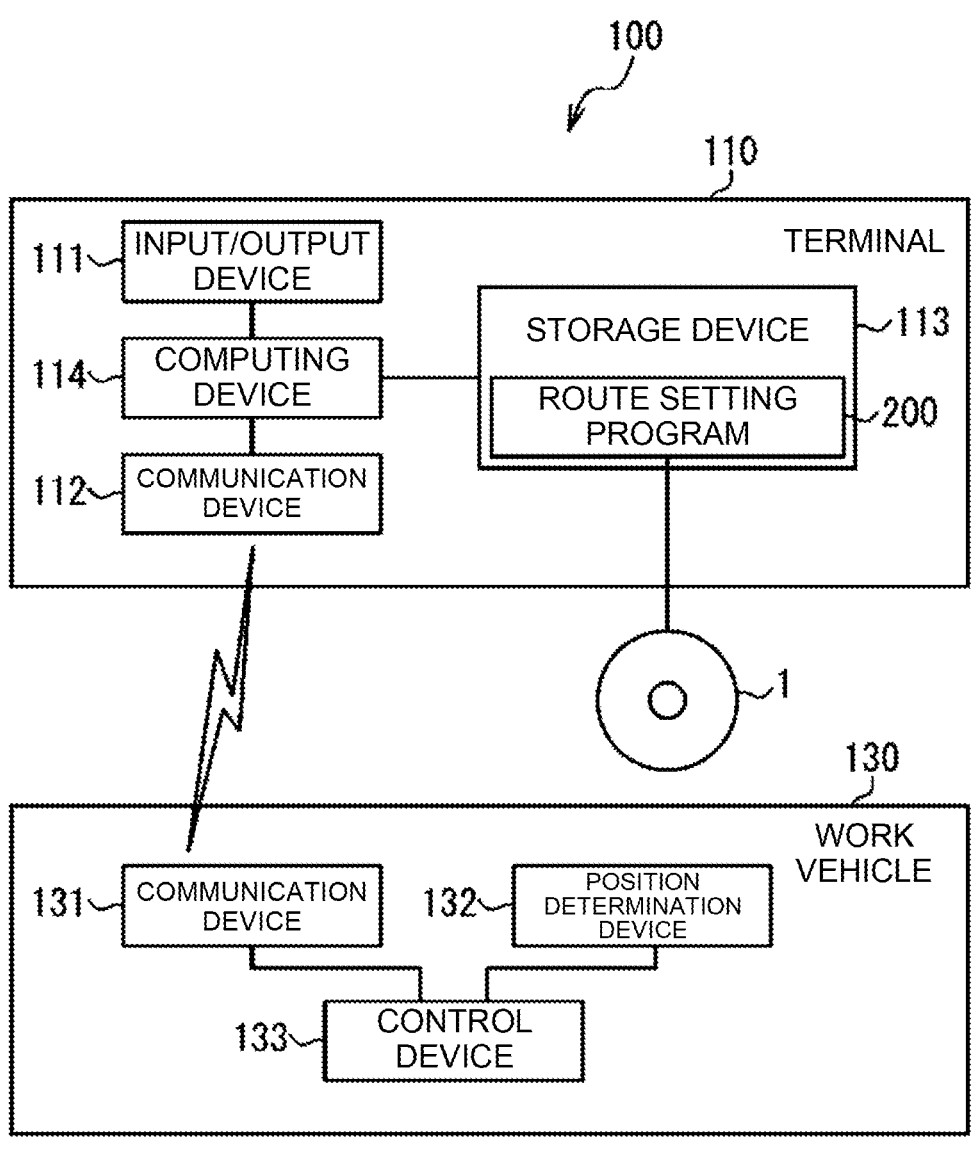
FIG. 2 is a configuration diagram of an autonomous traveling system in one embodiment.

The autonomous traveling system 100 includes a terminal 110 and a work vehicle 130 as illustrated in FIG. 2. The terminal 110 creates a route along which the work vehicle 130 moves within a field. Examples of the terminal 110 include a computer, a tablet, and a mobile phone. The terminal 110 includes an input/output device 111, a communication device 112, a storage device 113, and a computing device 114. Information for the computing device 114 to execute processing is input into the input/output device 111. In addition, the input/output device 111 outputs a result of processing executed by the computing device 114. The input/output device 111 includes various input devices and output devices, and examples thereof include a keyboard, a mouse, a microphone, a display, a speaker, and a touch panel.

The communication device 112 communicates with a communication device 131 of the work vehicle 130. The communication device 112 transfers each piece of information acquired from the work vehicle 130 to the computing device 114. In addition, a signal created by the computing device 114 is transferred to the communication device 131 of the work vehicle 130. Examples of the communication device 112 include a transceiver for a wireless local area network (LAN) and various interfaces such as a network interface card (NIC) and a universal serial bus (USB).

The storage device 113 stores various kinds of data, such as a route setting program 200, for setting a route for the work vehicle 130. The storage device 113 is used as a non-transitory tangible storage medium for storing the route setting program 200. The route setting program 200 may be provided as a computer program product recorded on a computer-readable storage medium 1, or may be provided as a computer program product that can be downloaded from a server.

Figure 3:
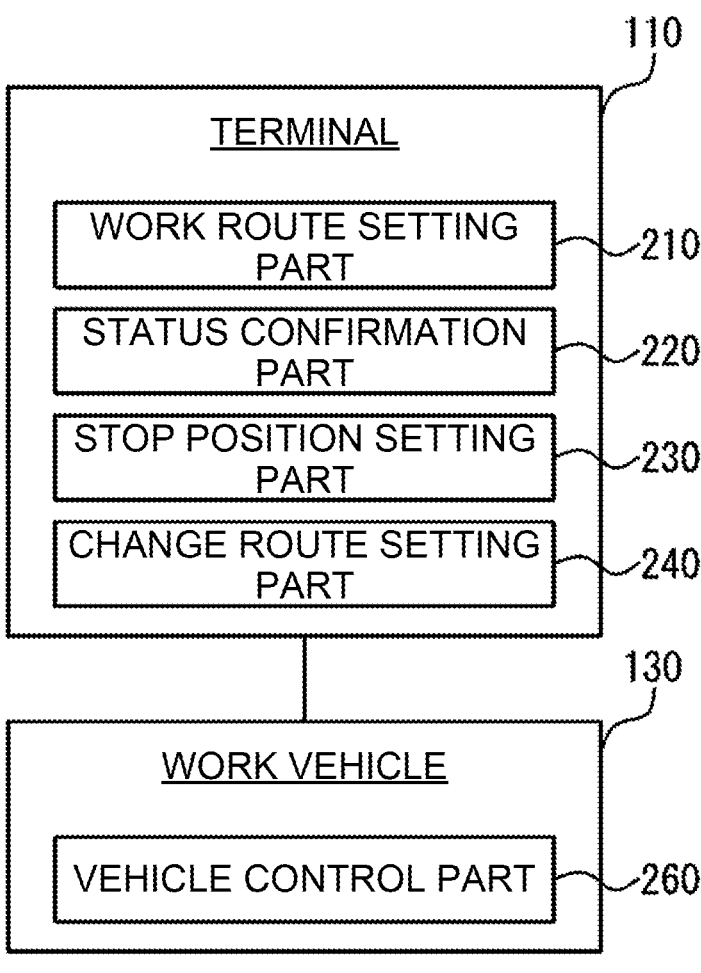
FIG. 3 is a functional block diagram of an autonomous traveling system in one embodiment.

The computing device 114 reads out the route setting program 200 from the storage device 113 and executes same, thereby performing various kinds of data processing for setting a route for the work vehicle 130. The computing device 114 executes the route setting program 200 to realize a work route setting part 210, a status confirmation part 220, a stop position setting part 230, and a change route setting part 240, as illustrated in FIG. 3. Examples of the computing device 114 include a central processing unit (CPU).

The work route setting part 210 creates the work route 140 along which the work vehicle 130 moves when work is carried out in the field 10. The status confirmation part 220 acquires positions of the work vehicle 130 in the field at respective times and confirms the work status in the field 10. The stop position setting part 230 sets the stop position 13 at which the work vehicle 130 stops for, for example, replenishment of materials. The change route setting part 240 creates a change route along which the work vehicle 130 moves to the stop position 13.

Next, a configuration of the work vehicle 130 is described. As illustrated in FIG. 2 the work vehicle 130 includes the communication device 131, a position determination device 132, and a control device 133. The communication device 131 communicates with the communication device 112 of the terminal 110. The communication device 131 transfers each piece of information acquired from the computing device 114 of the terminal 110 to the control device 133. In addition, a signal created by the control device 133 is transferred to the communication device 112 of the terminal 110. Examples of the communication device 131 include a transceiver for a wireless local area network (LAN) and various interfaces such as a network interface card (NIC) and a universal serial bus (USB).

The position determination device 132 measures the position of the work vehicle 130. The position determination device 132 is, for example, a receiver of a global navigation satellite system (GNSS), and receives a signal from an artificial satellite or a terrestrial base station and measures the positions of the work vehicle 130 at respective times. Position information indicating the measurement time and the measured position is sent to the control device 133.

The control device 133 controls each part of the work vehicle 130 to realize a vehicle control part 260 illustrated in FIG. 3. The vehicle control part 260 acquires the position information on the work vehicle 130 from the position determination device 132, performs an operation of the work vehicle 130, such as acceleration, steering, and braking, to move the work vehicle 130 along a route acquired from the terminal 110. In addition, the vehicle control part 260 controls the operation of the work vehicle 130 to carry out work within the field 10. Examples of the control device 133 include a computing device such as a central processing unit (CPU).

Action of Autonomous Traveling System

Figure 4:
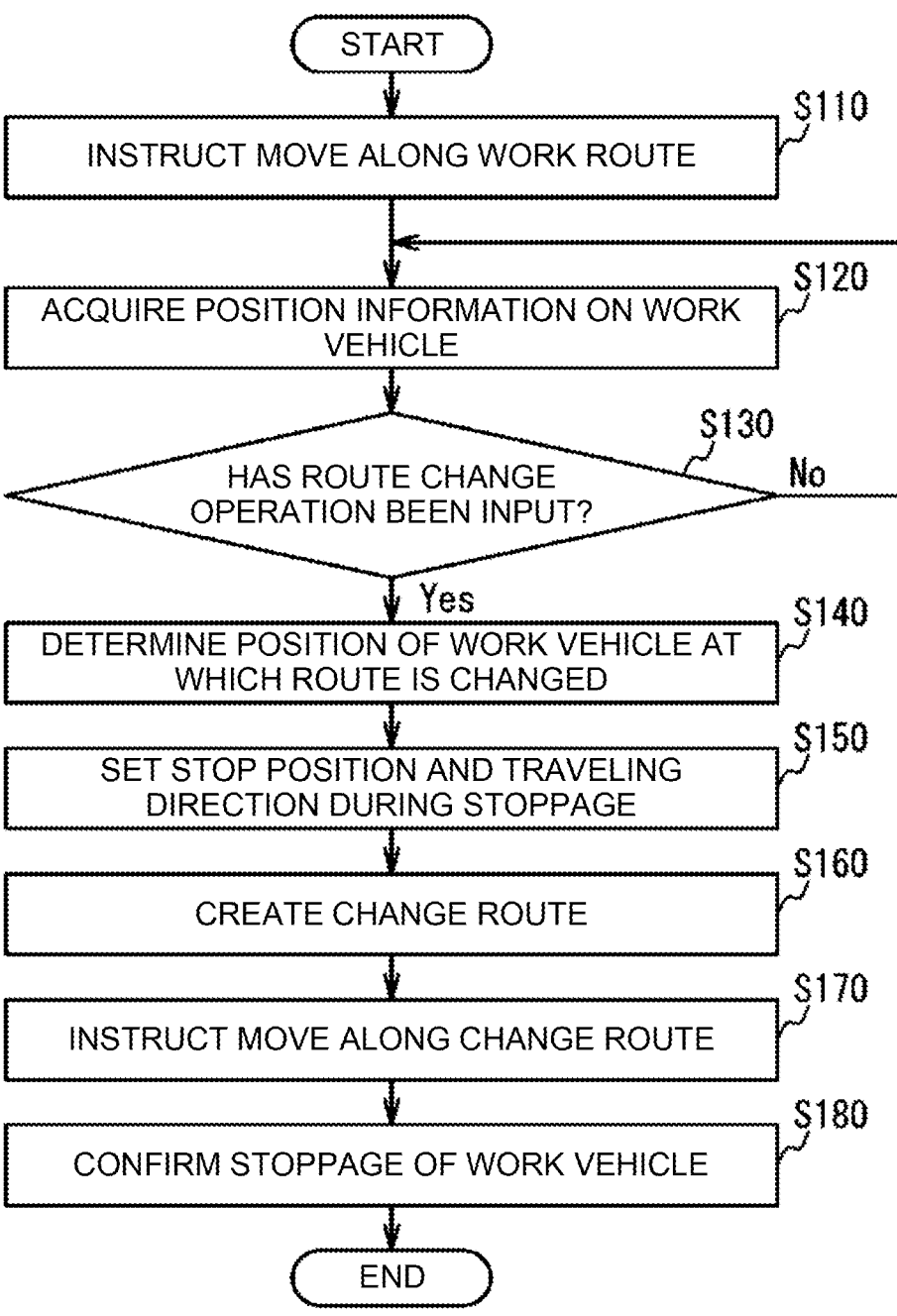
FIG. 4 is a flowchart representing processing executed by a route setting program in one embodiment.

When the work vehicle 130 moves to a position at which work in the field 10 is to be started, and a worker inputs an operation for starting work into the terminal 110, the terminal 110 executes the processing illustrated in FIG. 4 serving as a route setting method. In step S110, the work route setting part 210 realized by the computing device 114 of the terminal 110 creates a work start signal indicating the work route 140 and a start of work and sends same to the vehicle control part 260 of the work vehicle 130. The vehicle control part 260 controls, upon receiving the work start signal, the work vehicle 130 such that the work vehicle 130 automatically moves along the work route 140 indicated by the work start signal. In addition, the vehicle control part 260 controls an operation of the work machine on the basis of the work start signal. Incidentally, the work route 140 is set before starting work and stored in the storage device 113 of the terminal 110.

In step S120, the status confirmation part 220 acquires the position information from the vehicle control part 260 of the work vehicle 130. Specifically, the vehicle control part 260 sends the information on the position measured by the position determination device 132 to the status confirmation part 220. The status confirmation part 220 acquires the positions of the work vehicle 130 at respective times from the acquired position information. The status confirmation part 220 acquires the position of the work vehicle 130 in the work route 140 on the basis of the acquired positions of the work vehicle 130. The status confirmation part 220 may acquire a status, for example, the current position, direction of travel, or speed of the work vehicle 130 on the basis of the acquired positions of the work vehicle 130 at respective times.

In step S130, the status confirmation part 220 determines whether a route change operation for moving the work vehicle 130 to the stop position 13 has been input into the input/output device 111 of the terminal 110 or not. For example, the status confirmation part 220 displays a route change button on the input/output device 111 of the terminal 110 and receives a route change operation from a user. When the user selects the route change button on the input/output device 111 of the terminal 110, the status confirmation part 220 determines that the route change operation has been input. When the status confirmation part 220 determines that no route change operation has been input, the processing is returned to step S120 and repeated. When the status confirmation part 220 determines that the route change operation has been input, the processing shifts to step S140.

Figure 5:
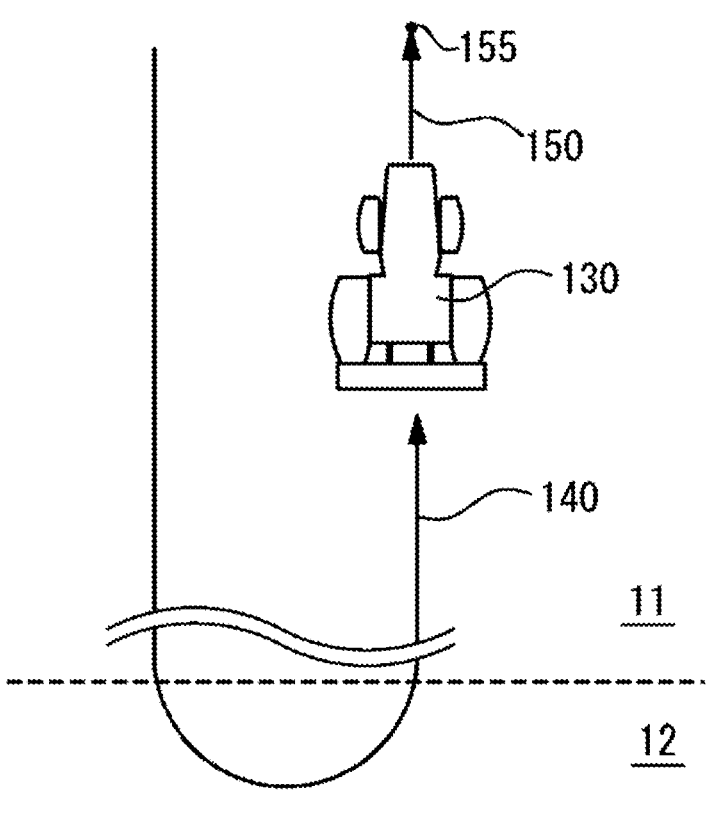
FIG. 5 is a diagram illustrating a transition position from a work route to a change route in one embodiment.

In step S140, the change route setting part 240 determines a change start position 155 of the work vehicle 130 for changing the route from the work route 140 to a change route on the basis of the current position of the work vehicle 130. The change route setting part 240 acquires a delay time from input of the route change operation until the route for the work vehicle 130 is changed. The delay time is determined on the basis of, for example, the processing time required to create a change route. The change route setting part 240 determines, on the basis of the current position of the work vehicle 130, the position of the work vehicle 130 at the time at which a change waiting time indicating the time period equal to or more than the acquired delay time has passed from the time when the route change operation is input. For example, as illustrated in FIG. 5, the change route setting part 240 calculates a supposed moving route 150 along which the work vehicle 130 moves for a predetermined time along the work route 140. The change route setting part 240 determines a terminal point of the supposed moving route 150 as the change start position 155. In addition, the change route setting part 240 may determine the supposed moving route 150 as a route along which the work vehicle 130 moves in the direction of travel a predetermined distance such as 1 m. In this case, the predetermined distance is determined so as to be larger than the distance the work vehicle 130 travels during the delay time. In addition, the delay time may be preliminarily stored in the storage device 113, and may be calculated on the basis of a history of time required for each processing, for example, on the basis of a communication delay between the terminal 110 and the work vehicle 130.

Figure 6:
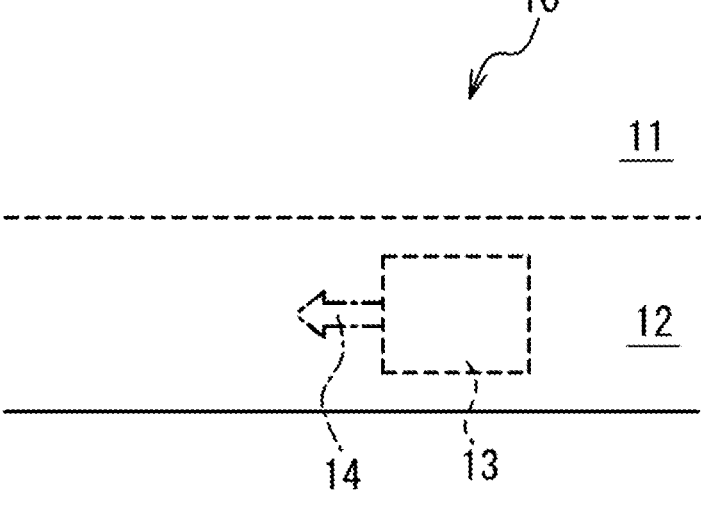
FIG. 6 is a diagram illustrating a stop position and a stop direction in one embodiment.

In step S150 illustrated in FIG. 4, the stop position setting part 230 selects, in response to an input from a user, the stop position 13 and the stop direction 14 indicating the direction of travel of the work vehicle 130 stopping at the stop position 13. For example, as illustrated in FIG. 6, the user selects the stop position 13 on a map of the field displayed on the input/output device 111 of the terminal 110. The stop position setting part 230 sets the selected spot position 13 as a destination of the change route. Furthermore, the user selects the stop direction 14 indicating the direction of travel of the work vehicle 130 stopping at the stop position 13. The stop position setting part 230 sets the selected stop direction 14 as the direction of travel when the work vehicle 130 reaches the stop position 13. The stop position 13 and the stop direction 14 may be preliminarily set and may be selected from multiple combinations.

In step S160 illustrated in FIG. 4, the change route setting part 240 creates a change route with the change start position 155 as a starting point and the stop position 13 as a terminal point. A method for creating the change route will be described later.

In step S170, the change route setting part 240 creates a change start signal indicating the change route and sends same to the vehicle control part 260 of the work vehicle 130. The vehicle control part 260 changes, upon receiving the change start signal, the route after the change start position 155 to the change route indicated by the change start signal. Therefore, the vehicle control part 260 controls the work vehicle 130 such that the work vehicle 130 automatically moves along the work route 140 to the change start position 155 and moves along the change route from the change start position 155 without stopping.

In addition, the status confirmation part 220 acquires the position information from the vehicle control part 260 of the work vehicle 130. Specifically, the vehicle control part 260 sends the information on the position measured by the position determination device 132 to the status confirmation part 220. The status confirmation part 220 acquires the positions of the work vehicle 130 at respective times from the acquired position information.

In step S180, the status confirmation part 220 confirms that the work vehicle 130 has reached the stop position 13 and stopped. When the status confirmation part 220 confirms that the work vehicle 130 has stopped, processing is terminated.

As such, the computing device 114 creates the change route such that the work vehicle 130 stops at the stop position 13 facing the set stop direction 14. The vehicle control part 260 moves the work vehicle 130 along the created change route. As such, the autonomous traveling method allows the work vehicle 130 to move to the set stop position 13 such that the direction of travel is in line with the stop direction.

Change Route Creating Method

Next, a change route creating method will be described. The computing device 114 of the terminal 110 executes the processing illustrated in FIG. 7 to create a change route. The change route setting part 240 realized by the computing device 114 of the terminal 110 creates a first route 410 on the basis of the stop position 13 in step S210. Specifically, as illustrated in FIG. 8, the change route setting part 240 sets a line segment extending a predetermined direction such as 1 m in the direction opposite to the stop direction 14 as the first route 410, with the stop position 13 as a terminal point. The first route 410 indicates that the work vehicle 130 travels in the stop direction 14 along the set line segment.

Figure 7:
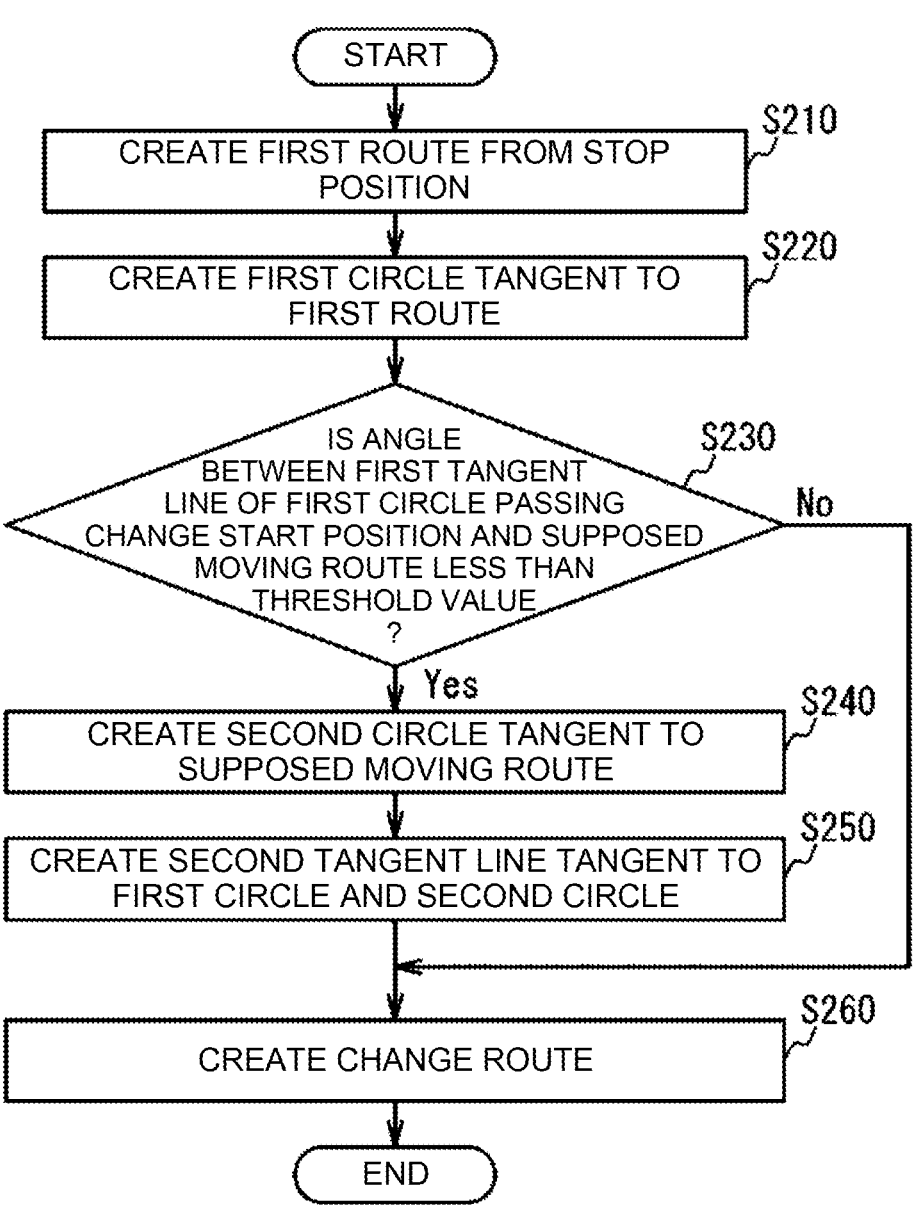
FIG. 7 is a flowchart representing processing for creating a change route in one embodiment.
Figure 8:
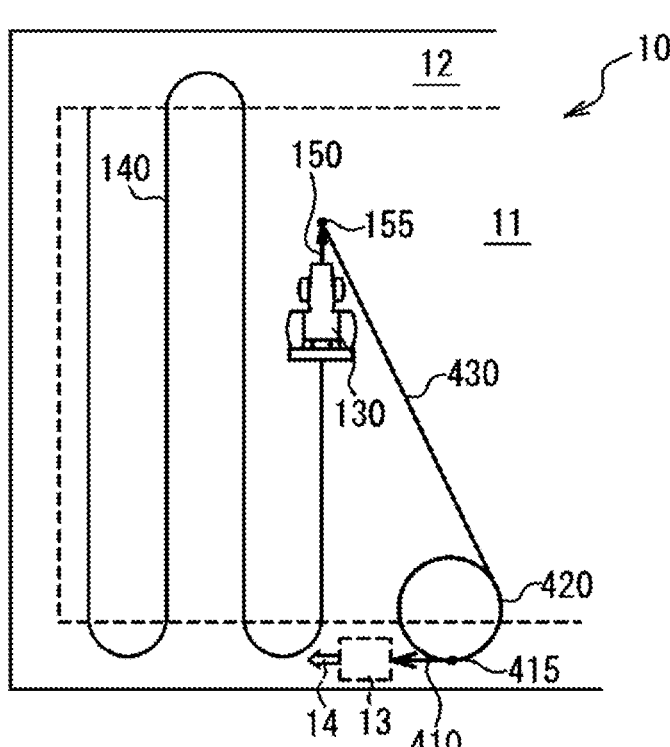
FIG. 8 is a diagram illustrating processing for creating a change route in one embodiment.

In step S220 illustrated in FIG. 7, the change route setting part 240 creates a first circle 420 tangent to the first route 410 and creates a route along which the work vehicle 130 enters the first route 410. As illustrated in FIG. 8, the change route setting part 240 creates the first circle 420 tangent to the first route 410 with a first starting point 415 of the first route 410 as the tangent point. More particularly, the first circle 420 is created so as to be tangent to a straight line including the first route 410. In the example of FIG. 8, the work vehicle 130 moves along the first route 410 by changing the direction of travel to the right along the circumference of the first circle 420 and moving clockwise along the circumference of the first circle 420. Here, the first circle 420 has a turning circle radius indicating the minimum radius at which the work vehicle 130 can turn.

Figure 9:
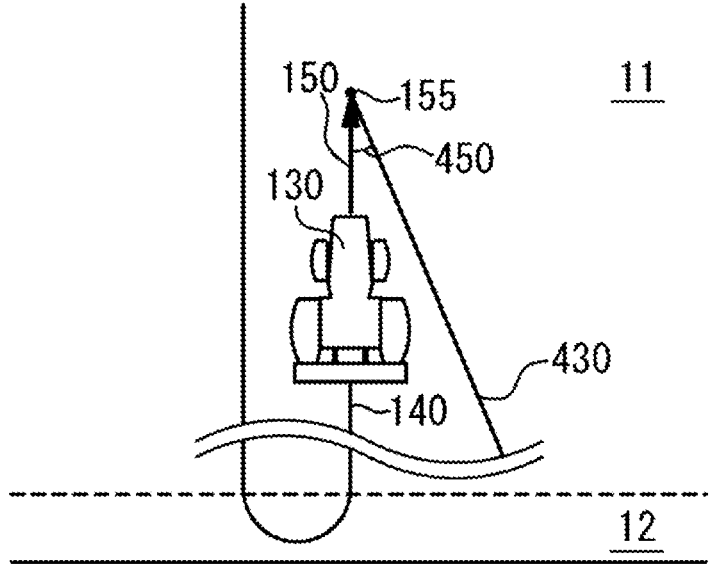
FIG. 9 is a diagram illustrating processing for creating a change route in one embodiment.

In step S230 illustrated in FIG. 7, the change route setting part 240 determines whether the angle between the first tangent line 430 passing the change start position 155 and tangent to the first circle 420 and the supposed moving route 150 until the work vehicle 130 moves to the change start position 155 is less than a threshold value. Specifically, as illustrated in FIG. 8, the change route setting part 240 creates the first tangent line 430 passing the change start position 155 and tangent to the first circle 420. Next, as illustrated in FIG. 9, a first angle 450 between the supposed moving route 150 and the first tangent line 430 is calculated. The change route setting part 240 compares the calculated first angle 450 with the threshold value to execute the processing of step S240 when the first angle 450 is less than the threshold value. The change route setting part 240 executes the processing of step S260 when the first angle 450 is equal to or more than the value threshold. Incidentally, the threshold value is determined on the basis of the angle at which the turning radius can be ignored when the work vehicle 130 changes the direction of travel. For example, in the case where the turning radius of the work vehicle 130 can be ignored when the angle at which the work vehicle 130 changes the direction of travel is 45 degrees or less, the threshold value is 135 degrees.

Figure 10:
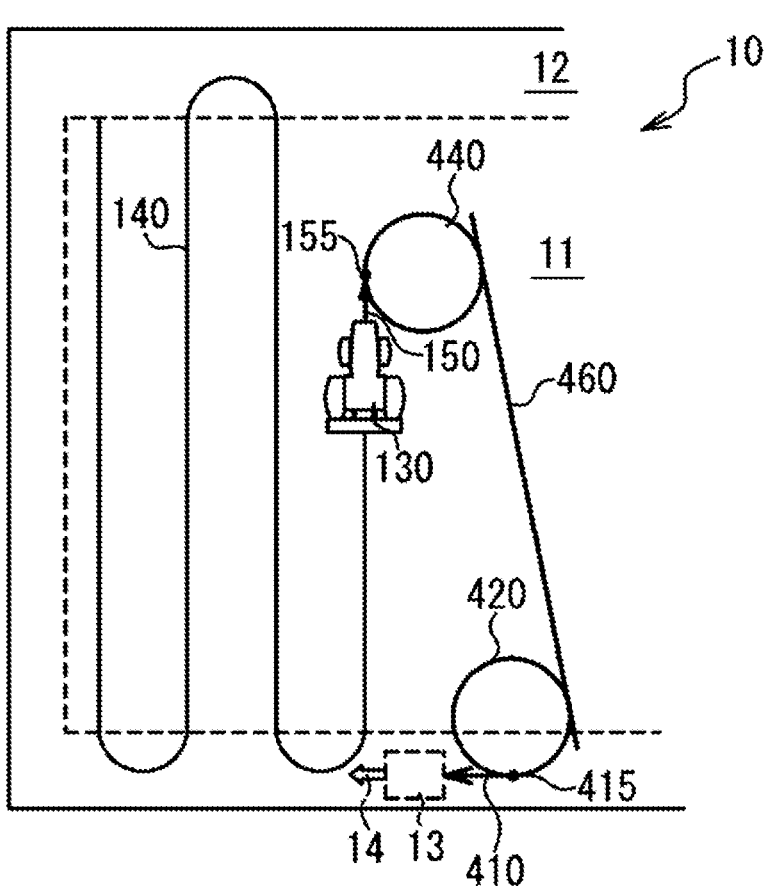
FIG. 10 is a diagram illustrating processing for creating a change route in one embodiment.

In step S240, the change route setting part 240 creates a second circle 440 with the terminal point of the supposed moving route 150 as a tangent point so that the work vehicle 130 turns toward the first circle 420. As illustrated in FIG. 10, the change route setting part 240 creates the second circle 440 tangent to the supposed moving route 150 with the change start position 155, which is the terminal point of the supposed moving route 150, as the tangent point. More particularly, the second circle 440 is created so as to be tangent to a straight line extending in the direction of travel of the work vehicle 130 at the terminal point of the supposed moving route 150. In the example of FIG. 10, the work vehicle 130 changes the direction of travel to the right along the circumference of the second circle 440 and moves clockwise along the circumference of the second circle 440, thereby orienting the direction of travel of the work vehicle 130 toward the first circle 420. Here, the second circle 440 has a turning circle radius indicating the minimum radius at which the work vehicle 130 can turn.

In step S250, the change route setting part 240 creates a second tangent line 460 tangent to the first circle 420 and the second circle 440. As illustrated in FIG. 10, the second tangent line 460 indicates a route along which the work vehicle 130 moves from the second circle 440 to the first circle 420. The circumference of the second circle 440 is a route along which the work vehicle 130 moves clockwise. Therefore, the change route setting part 240 creates the second tangent line 460 such that the second circle 440 is located to the right of the work vehicle 130 when the work vehicle 130 moves along the second tangent line 460. In addition, the circumference of the first circle 420 is also a route along which the work vehicle 130 moves clockwise. Therefore, the change route setting part 240 creates the second tangent line 460 such that the first circle 420 is located to the right of the work vehicle 130 when the work vehicle 130 moves along the second tangent line 460. As such, the second tangent line 460 is created according to the direction in which the work vehicle 130 turns when the work vehicle 130 moves on the circumference of the first circle 420 and the circumference of the second circle 440.

Figure 11:
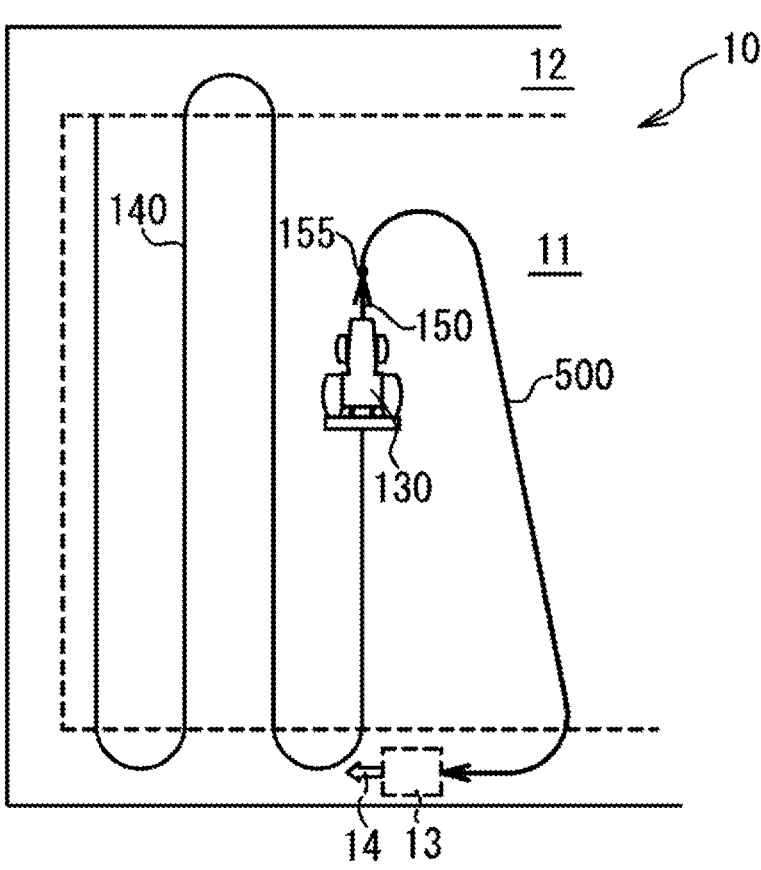
FIG. 11 is a diagram illustrating processing for creating a change route in one embodiment.

In step S260, the change route setting part 240 creates the change route connecting the created circles and line segment. In the example illustrated in FIG. 11, the change route setting part 240 sets, as a change route 500, the rout connecting the circumference of the second circle 440, the second tangent line 460, the circumference of the first circle 420, and the first route 410. Specifically, as illustrated in FIG. 10, of the circumference of the second circle 440, a circular arc connecting clockwise the change start position 155 as the starting point and the tangent point to the second tangent line 460 as the terminal point is set as part of the change route 500. Of the second tangent line 460, a line segment from the tangent point to the second circle 440 as the starting point to the tangent point to the first circle 420 as the terminal point is set as part of the change route 500. Of the circumference of the first circle 420, a circular arc connecting clockwise the tangent point to the second tangent line 460 as the starting point and the tangent point (first starting point 415) to the first route 410 as the terminal point is set as part of the change route 500. As such, the change route setting part 240 creates the change route 500 in which the circular arc of the circumference of the second circle 440 set as the change route 500, the line segment of the second tangent line 460 set as the change route 500, the circular arc of the circumference of the first circle 420 set as the change route 500, and the first route 410 are connected, and the processing for creating the change route 500 ends.

Incidentally, if it is determined as "NO" in step S230, specifically, if the first angle 450 between the first tangent line 430 and the supposed moving route 150 is the threshold value or more, the change route setting part 240 does not create the second circle 440. Thus, the change route setting part 240 creates the change route 500 connecting, for example, the first tangent line 430, the circumference of the first circle 420, and the first route 410 created.

As described above, the autonomous traveling system 100 can control the work vehicle 130 to move off the work route 140 to the predetermined stop position 13. Furthermore, the work vehicle 130 stops so that the direction of travel is oriented to a predetermined direction. In addition, the work vehicle 130 moves from the work route 140 to the change route 500 without stopping. As such, a worker can efficiently work by using the autonomous traveling system 100.

Embodiment 2

The autonomous traveling system 100 may move the work vehicle 130 to the stop position 13 without setting the direction of travel of the work vehicle 130 at the stop position 13. For example, the autonomous traveling system 100 may move the work vehicle 130 to the stop position 13 so that the time to move to the stop position 13 is shortened. A worker can thereby move the work vehicle 130 according to whether preference is given to the direction of travel of the work vehicle 130 at the stop position 13 or the time required to move to the stop position 13. For example, when the worker preferentially selects the time required to move to the stop position 13, the autonomous traveling system 100 moves the work vehicle 130 to the stop position 13 in a shortest route. Incidentally, since the configuration of the autonomous traveling system 100 is the same as that in Embodiment 1, the description thereon is omitted.
Action of Autonomous Traveling System When the work vehicle 130 moves to a position at which work in the field 10 is to be started, and a worker inputs an operation for starting work into the terminal 110, the terminal 110 executes the processing illustrated in FIG. 4, as in Embodiment 1. Since the action of the autonomous traveling system 100 is the same as that in Embodiment 1 except for processing to create the change route 500, the description on the processing illustrated in FIG. 4 is omitted.
Change Route Creation Method The computing device 114 of the terminal 110 executes the processing illustrated in FIGS. 12A and 12B to create the change route 500. The change route setting part 240 realized by the computing device 114 of the terminal 110 determines whether the stop direction 14 of the work vehicle 130 at the stop position 13 has been set in step S205. When the stop direction 14 has been set, the change route setting part 240 executes the processing of step S210. When the stop direction 14 has not been set, the change route setting part 240 executes the processing of step S330 illustrated in FIG. 12B.

Figure 12A:
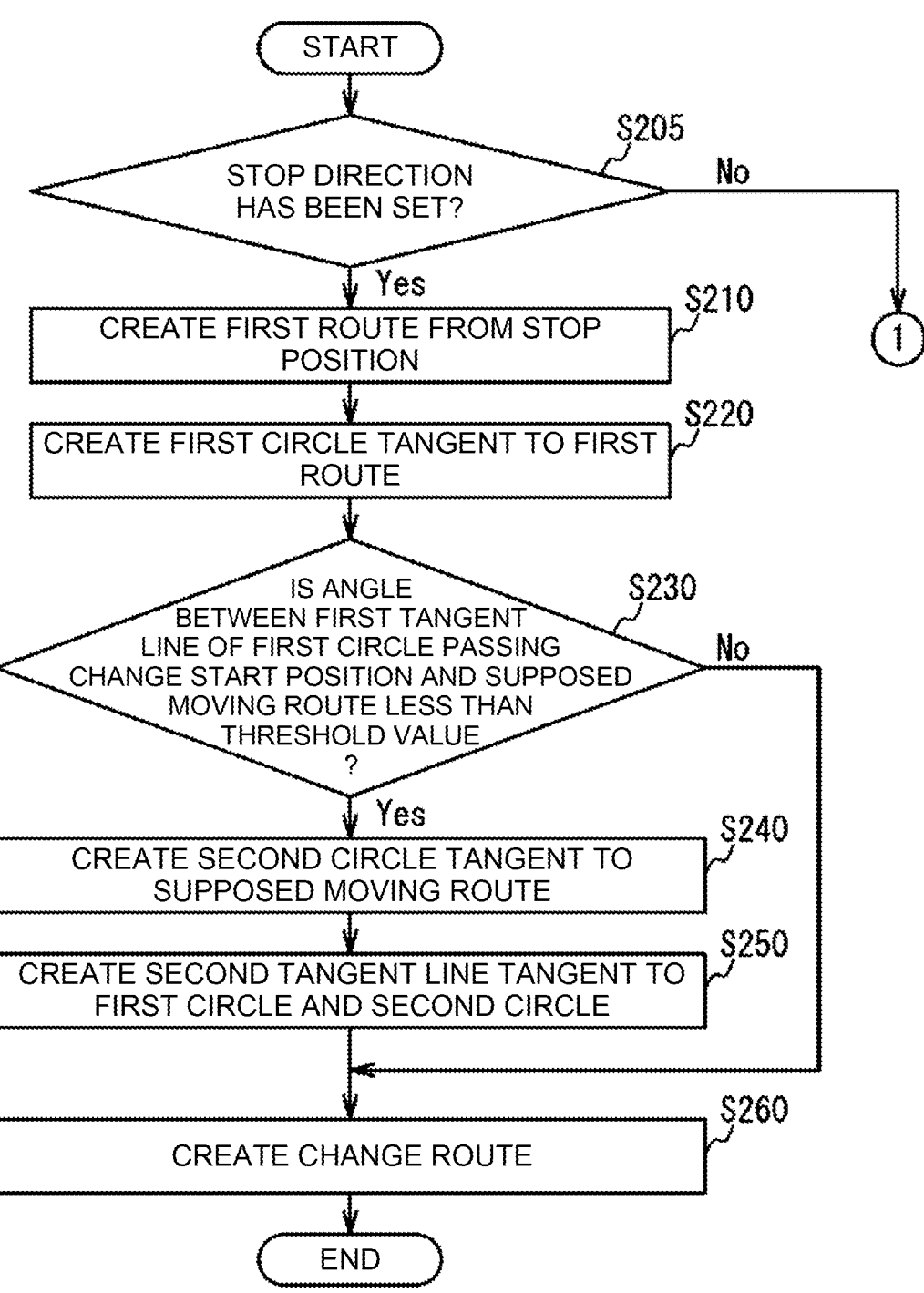
FIG. 12A is a flowchart representing processing for creating a change route in one embodiment.

Since the processing from step S210 to step S260 illustrated in FIG. 12A is the same as that in Embodiment 1, the description thereon is omitted.

Figure 12B:
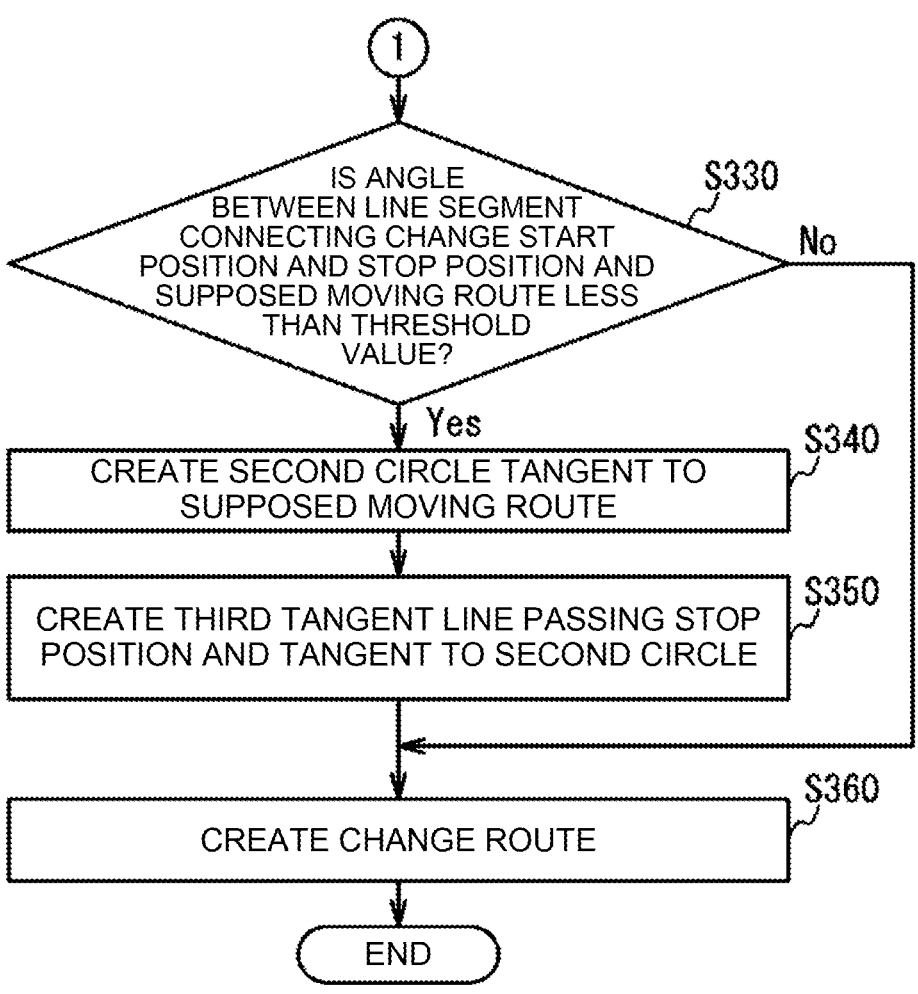
FIG. 12B is a flowchart representing processing for creating a change route in one embodiment.
Figure 13:
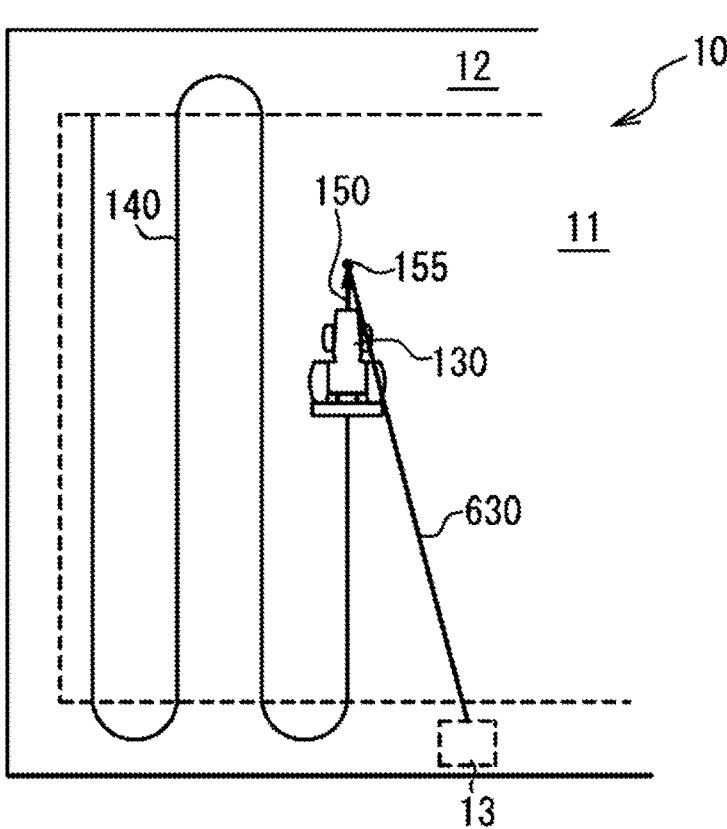
FIG. 13 is a diagram illustrating processing for creating a change route in one embodiment.
Figure 14:
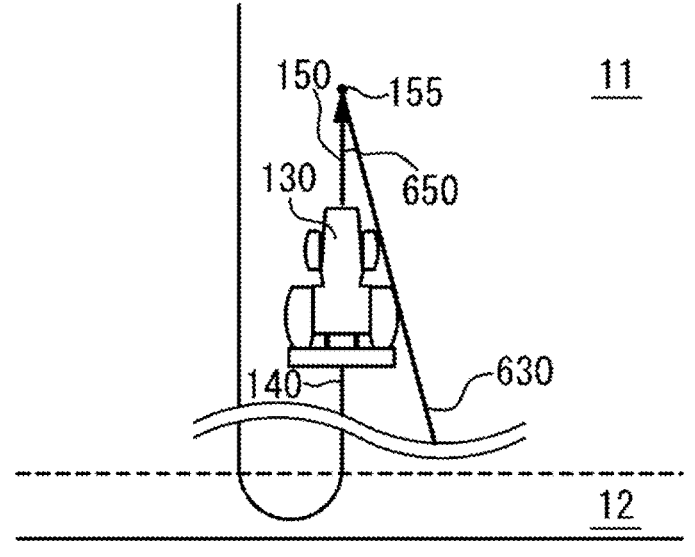
FIG. 14 is a diagram illustrating processing for creating a change route in one embodiment.

In step S330 illustrated in FIG. 12B, the change route setting part 240 determines whether the angle between the line segment connecting the change start position 155 and the stop position 13 and the supposed moving route 150 until the work vehicle 130 moves to the change start position 155 is less than a threshold value. Specifically, as illustrated in FIG. 13, the change route setting part 240 creates a first line segment 630 connecting the change start position 155 and the stop position 13. Next, as illustrated in FIG. 14, a second angle 650 between the supposed moving route 150 and the first line segment 630 is calculated. The change route setting part 240 compares the calculated second angle 650 with the threshold value and executes the processing of step S340 when the second angle 650 is less than the threshold value. The change route setting part 240 executes the processing of step S360 when the second angle 650 is the threshold value or more. Incidentally, the threshold value is determined on the basis of the angle at which the turning radius can be ignored when the work vehicle 130 changes the direction of travel.

Figure 15:
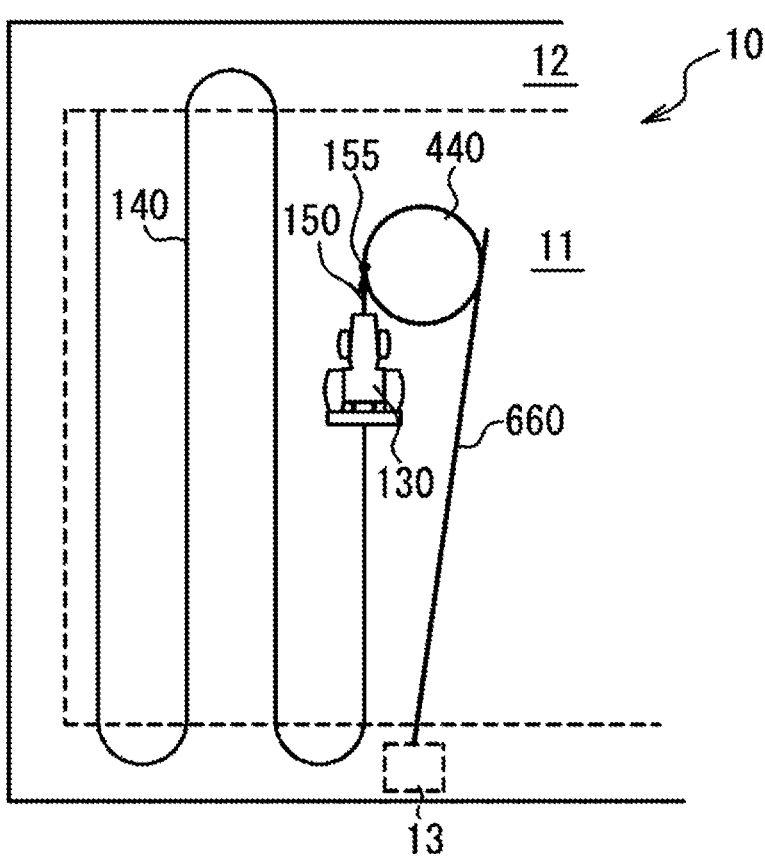
FIG. 15 is a diagram illustrating processing for creating a change route in one embodiment.

In step S340 illustrated in FIG. 12B, the change route setting part 240 creates a second circle 440 with the terminal point of the supposed moving route 150 as a tangent point so that the work vehicle 130 turns toward the stop position 13. As illustrated in FIG. 15, the change route setting part 240 creates the second circle 440 tangent to the supposed moving route 150 with the change start position 155, which is the terminal point of the supposed moving route 150, as the tangent point. In the example of FIG. 15, the work vehicle 130 changes the direction of travel to the right along the circumference of the second circle 440 and moves clockwise along the circumference of the second circle 440, thereby orienting the direction of travel of the work vehicle 130 to the stop position 13. Here, the second circle 440 has a turning circle radius indicating the minimum radius at which the work vehicle 130 can turn.

In step S350, the change route setting part 240 creates a third tangent line 660 passing the stop position 13 and tangent to the second circle 440. As illustrated in FIG. 15, the third tangent line 660 indicates a route along which the work vehicle 130 moves from the second circle 440 to the stop position 13. The circumference of the second circle 440 is a route along which the work vehicle 130 moves clockwise. Therefore, the change route setting part 240 creates the third tangent line 660 such that the second circle 440 is located to the right of the work vehicle 130 when the work vehicle 130 moves along the third tangent line 660. As such, the third tangent line 660 is created according to the direction in which the work vehicle 130 turns when the work vehicle 130 moves on the circumference of the second circle 440.

Figure 16:
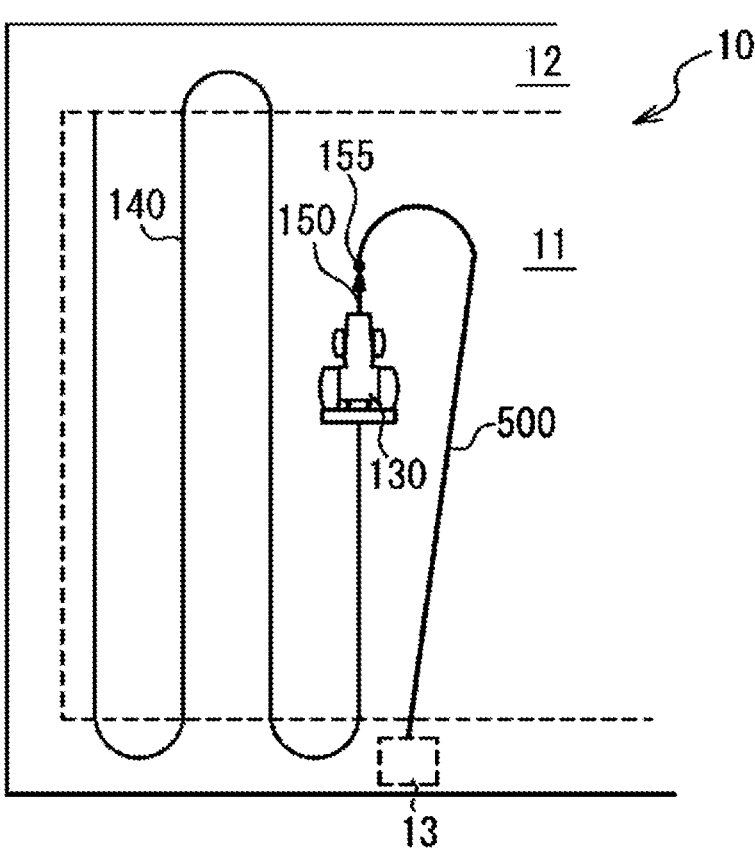
FIG. 16 is a diagram illustrating processing for creating a change route in one embodiment.

In step S360, the change route setting part 240 creates the change route 500 connecting the created circle and line segment. In the example illustrated in FIG. 16, the change route setting part 240 sets, as the change route 500, a rout connecting the circumference of the second circle 440, the second tangent line 460, the circumference of the first circle 420, and the first route 410. Specifically, as illustrated in FIG. 15, of the circumference of the second circle 440, a circular arc connecting clockwise the change start position 155 as the starting point and the tangent point to the third tangent line 660 as the terminal point is set as part of the change route 500. Of the third tangent line 660, a line segment from the tangent point to the second circle 440 as the starting point to the stop position 13 as the terminal point is set as part of the change route 500. As such, the change route setting part 240 creates, as the change route 500, a route in which the circular arc of the circumference of the second circle 440 set as the change route 500 and the line segment of the third tangent line 660 set as the change route 500 are connected, and the processing for creating the change route 500 ends.

Incidentally, if it is determined as "NO" in step S330, specifically, if the second angle 650 between the third tangent line 660 and the supposed moving route 150 is the threshold value or more, the change route setting part 240 does not create the second circle 440. Thus, the change route setting part 240 creates, as the change route 500, the first line segment 630 connecting, for example, the change start position 155 and the stop position 13 created.

As described above, the autonomous traveling system 100 can move the work vehicle 130 such that the time required to move to the stop position 13 is shortened by setting no stop direction 14. Accordingly, a worker can situationally select the change route 500. Incidentally, when the stop direction 14 is not set, the change route setting part 240 may create, as the change route 500, a shortest route in which the moving distance from the change start position 155 to the stop position 13 becomes shortest.

Variations

The configuration described in each embodiment is an example, and can be modified to the extent that does not interfere with the functions. Although an example in which the status confirmation part 220 moves the work vehicle 130 to the stop position 13 on the basis of an input of a route change operation has been described, but the present disclosure is not limited thereto. The status confirmation part 220 may move the work vehicle 130 to the stop position 13 on the basis of a predetermined instruction. For example, the status confirmation part 220 may move the work vehicle 130 in response to a replenishment instruction indicating that materials such as seedlings, fertilizers, and agrochemicals mounted on the work vehicle 130 are to be replenished. In this case, the status confirmation part 220 acquires the amount of the mounted materials from the work vehicle 130. When the acquired amount of materials is less than a threshold value, the status confirmation part 220 determines that a replenishment instruction for replenishing materials has been input. In addition, the status confirmation part 220 may determine that the replenishment instruction has been input, when a user inputs an operation for replenishment of materials.

In addition, the status confirmation part 220 may move the work vehicle 130 to the stop position 13 on the basis of a discharge instruction indicating that harvested crops are to be discharged. For example, the status confirmation part 220 acquires the amount of stored crops from the work vehicle 130. When the acquired amount of crops is more than a threshold value, the status confirmation part 220 determines that the discharge instruction for discharge of crops has been input. In addition, the status confirmation part 220 may determine that the discharge instruction has been input, when a user inputs an operation for replenishment of materials.

Furthermore, the status confirmation part 220 may move the work vehicle 130 to a stop position 13 set outside the work region 11 on the basis of a retreat instruction indicating retreat from the work region 11. For example, the status confirmation part 220 receives, from a user, a retreat operation for retreating the work vehicle 130 to the stop position 13. When the status confirmation part 220 receives the retreat operation, the status confirmation part 220 determines that the retreat instruction has been input. With the retreat instruction input, the change route setting part 240 creates a change route 500 along which the work vehicle 130 is moved to the stop position 13.

When the change route 500 is created, the change route setting part 240 may change the change route 500 as the change route 500 passes a travel prohibition region such as the outside of the field 10. For example, the change route setting part 240 changes the change route 500 such that the work vehicle 130 moves along the boundary of the travel prohibition region such as the boundary between the field 10 and the outside of the field 10 as the change route 500 passes the travel prohibition region. Specifically, the change route setting part 240 extracts, as the starting point, the position where the work vehicle 130 enters the travel prohibition region such as the position where the work vehicle 130 exits to the outside of the field 10, when the work vehicle 130 moves along the created change route 500. In addition, the change route setting part 240 extracts, as the terminal point, the position where the work vehicle 130 exits from the travel prohibition region such as the position where the work vehicle 130 enters the inside of the field 10 from the outside, when the work vehicle 130 moves along the created change route 500. The change route setting part 240 creates a detour route connecting the extracted starting point and the terminal point along the outer periphery of the travel prohibition region such as the boundary between the field 10 and the outside of the field 10. The change route setting part 240 changes a route of the change route 500 included in the travel prohibition region to the created detour route. Consequently, a change route 500 not passing through the travel prohibition region is created. Incidentally, the travel prohibition region indicates, for example, the outside of the field 10 and may be changed by a user.

The position determination device 132 may be arbitrarily selected as long as it can measure the position of the work vehicle 130. For example, the position determination device 132 may measure the position of the work vehicle 130 by acquiring the speed, direction of travel, and the like of the work vehicle 130 and calculating the moving route of the work vehicle 130.

In step S205 illustrated in FIG. 12A, the change route setting part 240 may determine whether to give preference to the stop direction 14 or the time required to move to the stop position 13. For example, the status confirmation part 220 receives whether to give preference to the stop direction 14 or the time required to move to the stop position 13. A user inputs whether to give preference to the stop direction 14 or the time required to move to the stop position 13 when inputting a route change operation into the input/output device 111 of the terminal 110. The change route setting part 240 shifts to the processing of step S210 when a direction preference instruction indicating that preference is given to the stop direction 14 has been input. The change route setting part 240 shifts to the processing of step S330 when a time preference instruction indicating that preference is given to the time required to move to the stop position 13 has been input.

Although an example in which the stop position 13 is set within the field 10, the present disclosure is not limited thereto, and the stop position 13 may be set outside the field 10, for example, within another field adjacent to the field 10. In this case, the change route setting part 240 creates a change route 500 along which the work vehicle 130 moves from the field 10 to another field adjacent to the field 10. The vehicle control part 260 moves the work vehicle 130 from the field 10 to another field adjacent to the field 10 as the work vehicle 130 moves along the created change route 500.

The embodiments and the variations described above are each an example, and the configurations described in the embodiments and the variations may be arbitrarily changed and/or arbitrarily combined to the extent that does not interfere with the functions. Furthermore, some of the functions described in the embodiments and the variations may be omitted as long as necessary functions can be achieved. For example, the terminal 110 may be realized by a plurality of terminals 110, and the terminal 110 may be a route setting device provided with the status confirmation part 220 and the change route setting part 240. In addition, the terminal 110 may be an autonomous traveling system provided with the vehicle control part 260.

In addition, the change route setting part 240 may perform only part of the processing. For example, the autonomous traveling system 100 may control the work vehicle 130 such that the work vehicle 130 stops when the route is changed from the work route 140 to the change route 500. In this case, the change route setting part 240 performs processing, in step S140 in FIG. 4, with the change start position 155 of the work vehicle 130 at the time of changing the route taken as the current position of the work vehicle 130. In addition, the autonomous traveling system 100 may omit the processing for setting the stop direction 14 and may not control the direction of travel of the work vehicle 130 at the stop position 13.

The present application claims priority based on Japanese Patent Application No. 2020-212146 filed on Dec. 22, 2020, and the entire disclosure thereof is incorporated herein.

The invention claimed is:

1. An autonomous travel method comprising:
controlling steering of a work vehicle such that the work vehicle travels in a field along a preset work route;
transmitting, to a computing device, a position of the work vehicle;
receiving, from the computing device, a change route along which the work vehicle is to travel to a stop position not included in the preset work route, wherein the change route is based on the stop position and the position of the work vehicle; and
controlling steering of the work vehicle such that the work vehicle travels along the change route to the stop position,
wherein a starting point of the change route indicates a position of the work vehicle at a time at which a change waiting time equal to or longer than a delay time set based on a processing time for creating the change route has elapsed after the computing device received an instruction to determine the change route.

2. The autonomous travel method according to claim 1, wherein a route from a position of the work vehicle at a time of the computing device receiving the instruction to the starting point of the change route is included in the preset work route.

3. The autonomous travel method according to claim 1, wherein the change route is created so that a direction of travel of the work vehicle is in line with a set stop direction at the stop position.

4. The autonomous travel method according to claim 3, wherein the change route includes a first route indicating a line segment extending in a direction opposite to the set stop direction from the stop position.

5. The autonomous travel method according to claim 4, wherein the change route includes a circular arc of a circle tangent to the first route at a starting point of the first route, and
the circular arc of the circle is connected to the first route at the starting point of the first route.

6. The autonomous travel method according to claim 3, wherein transmitting the position of the work vehicle includes transmitting whether to give preference to the set stop direction or a time required to move to the stop position, and
the change route gives preference to one of the set stop direction and the time required to move to the stop position according to the transmitting.

7. The autonomous travel method according to claim 1, wherein the change route includes a circular arc of a circle tangent to a straight line extending along a direction of travel of the work vehicle at the starting point of the change route, and
the circular arc of the circle includes the starting point of the change route.

8. The autonomous travel method according to claim 1, wherein the change route changes, when the change route passes a set travel prohibition region, a route included in a set travel prohibition region to a route along an outer periphery of the set travel prohibition region.

9. An autonomous travel system comprising:
a processor; and
a memory in communication with the processor and storing processor-executable code, which when executed by the processor, causes the processor to perform operations including:
controlling steering of a work vehicle such that the work vehicle travels in a field along a preset work route;
transmitting, to a computing device, a position of the work vehicle;
receiving, from the computing device, a change route along which the work vehicle is to travel to a stop position not included in the preset work route, wherein the change route is based on the stop position and the position of the work vehicle; and
controlling steering of the work vehicle such that the work vehicle travels along the change route to the stop position,
wherein a starting point of the change route indicates a position of the work vehicle at a time at which a change waiting time equal to or longer than a delay time set based on a processing time for creating the change route has elapsed after the computing device received an instruction to determine the change route.

10. An autonomous travel method comprising:
controlling steering of a work vehicle such that the work vehicle travels in a field along a preset work route;

transmitting, to a computing device, a position of the work vehicle;

receiving, from the computing device, a change route along which the work vehicle is to travel to a stop position not included in the preset work route, wherein the change route is based on the stop position and the position of the work vehicle, and wherein a start position of the change route is based on a duration of time spent creating the change route; and controlling steering of the work vehicle such that the work vehicle travels along the change route to the stop position, wherein the change route is created so that a direction of travel of the work vehicle is in line with a set stop direction at the stop position.

\* \* \* \* \*